Figure 3:
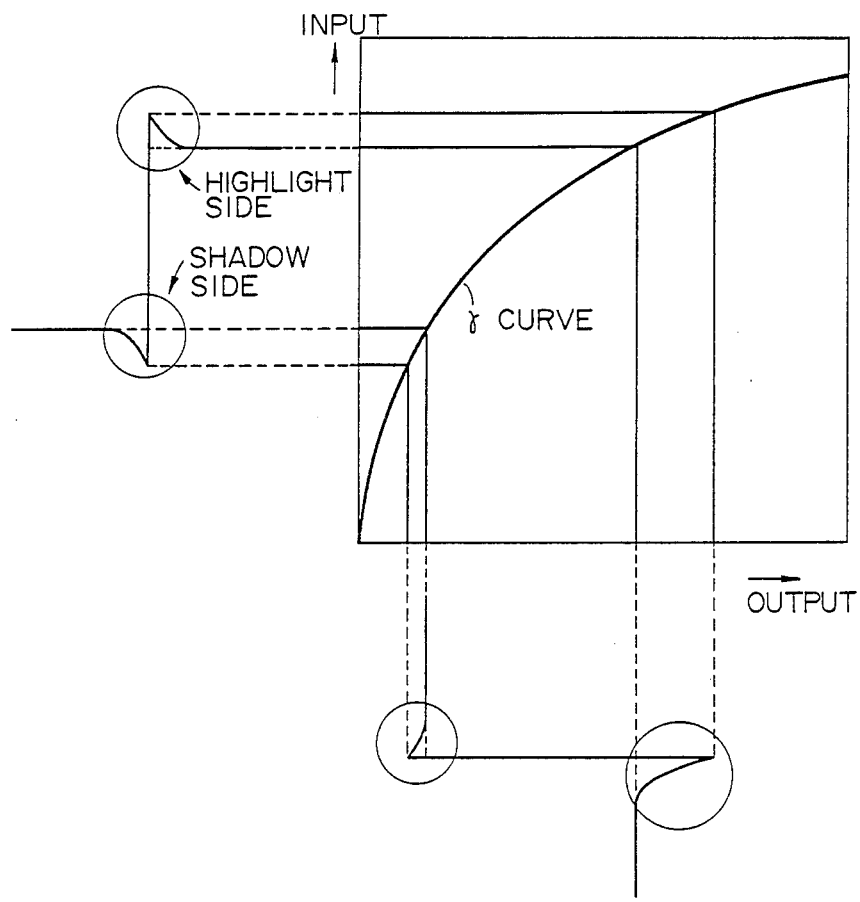

United States Patent [19]

Shinada

[11] Patent Number: 4,843,472
[45] Date of Patent: Jun. 27, 1989

[54] PROCESSOR FOR EMPHASIZING EDGES OF A VIDEO SIGNAL

[75] Inventor: Toru Shinada, Kanagawa, Japan

[73] Assignee: Fuji Photo Film Co., Ltd., Kanagawa, Japan

[21] Appl. No.: 129,773

[22] Filed: Dec. 7, 1987

[30] Foreign Application Priority Data

Dec. 22, 1986 [JP] Japan .................................. 61-303852

[51] Int. Cl.$^4$ .......................... H04N 5/202; H04N 5/57
[52] U.S. Cl. .................................... 358/164; 358/168; 358/169
[58] Field of Search ................ 358/164, 166, 169, 168

[56] References Cited

U.S. PATENT DOCUMENTS 3,389,220  6/1968  Buzan .................................... 358/164
4,480,268  10/1984  Osawa .................................. 358/164
4,651,210  3/1987  Olson ................................... 358/164

Primary Examiner—Tommy P. Chin
Attorney, Agent, or Firm—Birch, Stewart, Kolasch & Birch

[57] ABSTRACT

A processing apparatus emphasizes edges of a video signal which is applied thereto and non-linear relative to density or luminance levels adapted for the reproduction of a video signal. The processing apparatus includes a linear converter for converting the non-linear video signal into a linear video signal. The linear video signal is applied to an edge-emphasizing unit to produce a linear edge-emphasized video signal. A non-linear converter is provided for applying non-linear processing to the linear edge-emphasized video signal, whereby a non-linear edge-emphasized video signal is achieved.

12 Claims, 2 Drawing Sheets

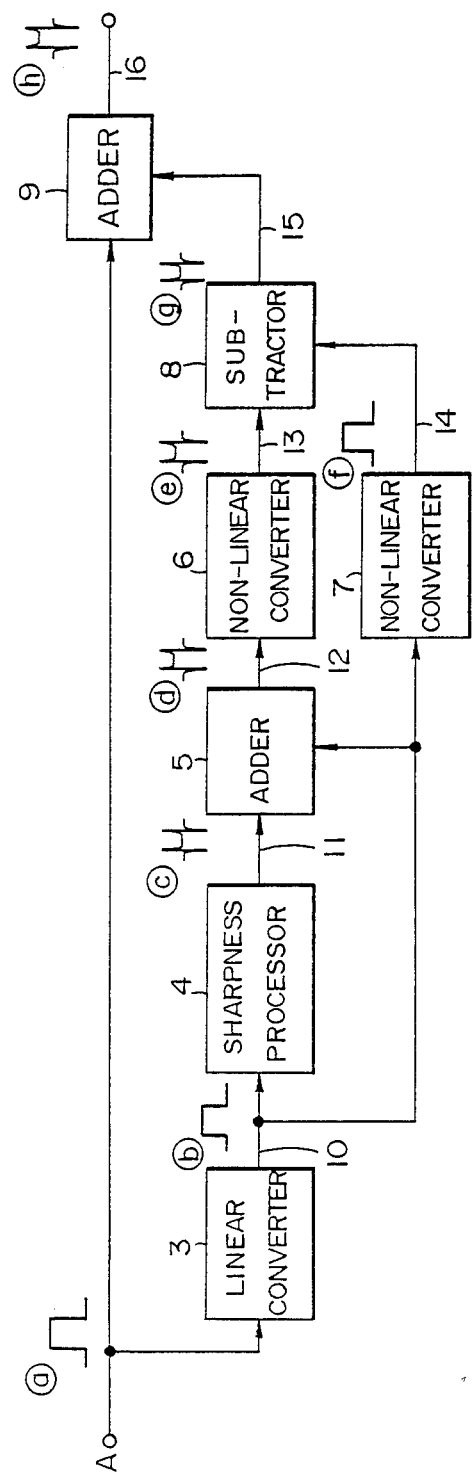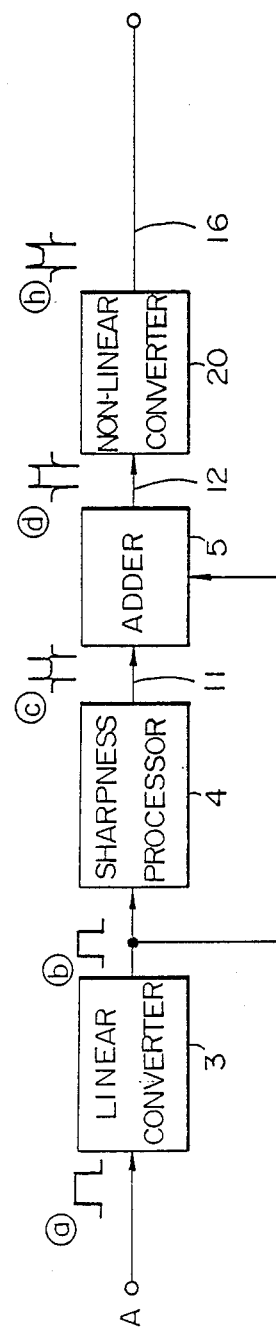

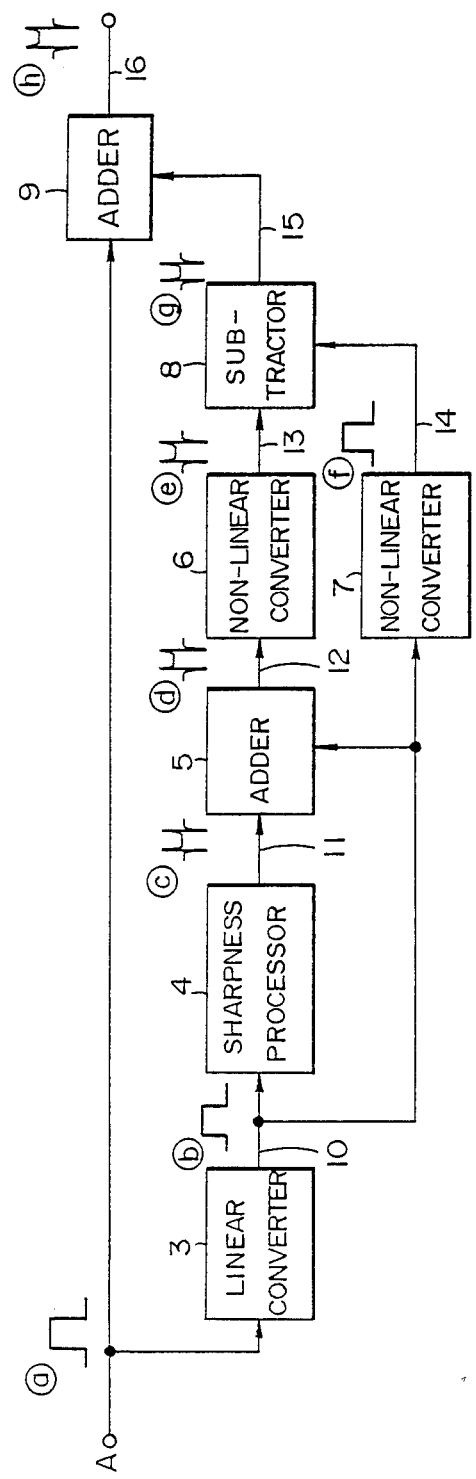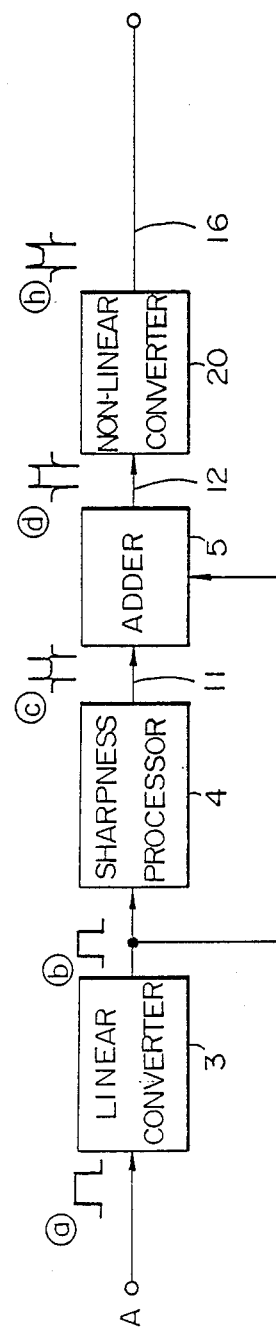

which is non-linear relative to density or luminance levels represented therein to produce a non-linear edge emphasized video signal, comprising:
- linear converting means for converting the non-linear video signal into a linear video signal;
- edge emphasizing means for applying edge emphasis to the linear video signal to produce a linear edge-emphasized video signal; and
- non-linear converting means for applying non-linear processing to the linear edge-emphasized video signal to produce the non-linear edge emphasized video signal.

2. A processing apparatus in accordance with claim 1, wherein said edge emphasizing means comprises:
- means for extracting edge portions of the linear video signal developed from said linear converting means and, then, emphasizing the edge portions to produce an edge-emphasized signal; and
- adding means for adding the linear video signal and the edge-emphasized signal to produce the linear edge-emphasized video signal for supply to said non-linear converting means.

3. A processing apparatus for emphasizing edges of a non-linear video signal which is supplied thereto and which is non-linear relative to density or luminance levels represented therein to produce a non-linear edge-compensated video signal, comprising:
- linear converting means for converting the non-linear video signal into a linear video signal;
- edge-emphasized signal producing means for producing a linear-edge-emphasized signal from the linear video signal;
- non-linear converting means for converting the linear edge-emphasized signal into a non-linear edge-emphasized signal; and
- first adding means for adding the non-linear edge-emphasized signal to the non-linear video signal to produce the non-linear edge-emphasized video signal.

4. A processing apparatus in accordance with claim 3, wherein said non-linear converting means comprises:
- first non-linear converting circuit for converting the linear edge-emphasized signal developed from said edge-emphasized signal producing means into a first non-linear video signal;
- second non-linear converting circuit provided with a substantially same conversion characteristic as said first non-linear converting circuit for converting the linear video signal developed from said linear converting means into a second non-linear video signal; and
- subtracting means for producing a difference between the first and second non-linear signals developed by said first and second non-linear converting circuits respectively to extract the non-linear edge-emphasized signal.

5. A processing apparatus in accordance with claim 4, wherein said edge-emphasized signal producing means comprises:
- means for extracting edge portions of the linear video signal developed from said linear converting means and, then, emphasizing the edge portions to produce an edge-emphasized signal; and
- second adding means for adding the linear video signal and the edge-emphasized signal to produce the linear edge-emphasized signal for supply to said first non-linear converting means.

6. A method of processing a non-linear video signal which is non-linear relative to density or luminance levels represented therein to produce a non-linear edge-emphasized video signal, comprising:
- (a) converting the non-linear video signal into a linear video signal;
- (b) emphasizing edges represented within said linear video signal to produce a linear edge-emphasized video signal; and
- (c) converting said linear edge-emphasized video signal into a non-linear edge-emphasized video signal.

7. The method of processing of claim 6 wherein said method substantially equally emphasizes the edges defining both highlights and shadows of the video image produced by said non-linear edge-emphasized video signal.

8. The method of processing of claim 6 wherein said step (b) of emphasizing comprises:
- (b1) extracting edge portions of the linear video signal;
- (b2) emphasizing the extracted edge portions to produce an edge-emphasized signal; and
- (b3) adding the edge-emphasized signal and the linear video signal to produce the linear edge-emphasized video signal.

9. A method of processing a non-linear video signal which is non-linear relative to density or luminescence levels represented therein to produce a non-linear edge-emphasized video signal, comprising:
- (a) converting the non-linear video signal into a linear video signal;
- (b) extracting edges represented within said linear video signal;
- (c) developing a linear edge-emphasized signal representing those edges;
- (d) converting said linear edge-emphasized signal into a non-linear edge-emphasized signal; and
- adding the non-linear edge emphasized signal to the non-linear video signal to produce a non-linear edge-emphasized video signal.

10. The method of processing of claim 9 wherein said method substantially equally emphasizes the edges defining both highlights and shadows of the video image produced by said non-linear edge-emphasized video signal.

11. The method of claim 10 wherein said step (d) of converting comprises:
- (d1) converting said linear edge-emphasized signal into a first non-linear video signal;
- (d2) converting said linear video signal developed by step a) of converting into a second non-linear video signal using substantially the same conversion characteristics as said step (d1) of converting; and
- (d3) taking the difference between the first and second non-linear signals to develop the non-linear edge-emphasized signal.

12. The method of processing of claim 9 wherein said step c) of developing comprises:
- (c1) emphasizing the edge portions extracted in said step b) of extracting to form an edge-emphasized signal; and
- (c2) adding the linear video signal and said edge-emphasized signal to form said linear edge-emphasized signal.

* * * * *